United States Patent
Peterson et al.

(10) Patent No.: US 10,156,673 B2
(45) Date of Patent: *Dec. 18, 2018

(54) LIGHT DIFFUSION WITH LIGHT-GENERATING SOURCES

(71) Applicant: Rohinni, LLC, Coeur d'Alene, ID (US)

(72) Inventors: Cody Peterson, Hayden, ID (US); Andrew Huska, Liberty Lake, WA (US); Kasey Christie, Austin, TX (US); Clint Adams, Coeur d'Alene, ID (US)

(73) Assignee: Rohinni, LLC, Coeur d'Alene, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/881,634

(22) Filed: Jan. 26, 2018

(65) Prior Publication Data

US 2018/0164494 A1 Jun. 14, 2018

Related U.S. Application Data

(63) Continuation of application No. 14/759,408, filed as application No. PCT/US2015/031254 on May 15, 2015, now Pat. No. 9,880,341.

(60) Provisional application No. 61/994,021, filed on May 15, 2014.

(51) Int. Cl.
*F21V 8/00* (2006.01)
*H01H 13/83* (2006.01)
*G02F 1/1335* (2006.01)

(52) U.S. Cl.
CPC ........... *G02B 6/0036* (2013.01); *G02B 6/009* (2013.01); *G02B 6/0068* (2013.01); *G02B 6/0091* (2013.01); *G02F 1/133603* (2013.01); *H01H 13/83* (2013.01)

(58) Field of Classification Search
None
See application file for complete search history.

(56) References Cited

U.S. PATENT DOCUMENTS

| | | | |
|---|---|---|---|
| 5,600,462 | A | 2/1997 | Suzuki et al. |
| 7,018,060 | B2 | 3/2006 | Choi et al. |
| 8,415,879 | B2 | 4/2013 | Lowenthal et al. |
| 8,497,951 | B2 | 7/2013 | Kobayashi |
| 2004/0135273 | A1 | 7/2004 | Parker et al. |
| 2006/0268571 | A1 | 11/2006 | Harada et al. |
| 2006/0279296 | A1 | 12/2006 | Lee et al. |
| 2007/0274079 | A1 | 11/2007 | Poh et al. |

(Continued)

FOREIGN PATENT DOCUMENTS

| | | |
|---|---|---|
| CN | 103511925 A | 1/2014 |
| JP | 2003109421 | 4/2003 |

(Continued)

OTHER PUBLICATIONS

Office action for U.S. Appl. No. 14/759,408, dated Apr. 28, 2017, Peterson, "Light Diffusion with Edge-Wrapped Light-Generating Sources", 9 pages.

(Continued)

*Primary Examiner* — Elmito Breval
(74) *Attorney, Agent, or Firm* — Lee & Hayes, P.C.

(57) ABSTRACT

Described herein are techniques related to orienting a plurality of light-generating sources of a lightguide to illuminate a backlit a device, such as a display or keyboard, with soft, even light. This Abstract is submitted with the understanding that it will not be used to interpret or limit the scope or meaning of the claims.

17 Claims, 7 Drawing Sheets

(56) References Cited

U.S. PATENT DOCUMENTS

| | | |
|---|---|---|
| 2008/0186737 A1 | 8/2008 | Awai et al. |
| 2009/0080215 A1 | 3/2009 | Anandan |
| 2010/0202128 A1 | 8/2010 | Saccomanno |
| 2011/0141395 A1 | 6/2011 | Yashiro |
| 2011/0187964 A1 | 8/2011 | Li et al. |
| 2011/0205760 A1 | 8/2011 | Ashoff |
| 2011/0228551 A1 | 9/2011 | Verschuren et al. |

FOREIGN PATENT DOCUMENTS

| | | |
|---|---|---|
| JP | 2011141960 | 7/2011 |
| WO | WO2008102287 A1 | 8/2008 |

OTHER PUBLICATIONS

Translated Japanese Office Action dated Jul. 3, 2018 for Japanese patent application No. 2017-512885, a counterpart foreign application of U.S. Pat. No. 9,880,341, 4 pages.

The Extended European Search Report dated Apr. 18, 2018 for European patent application No. 15793260.9, 10 pages.

LIGHT DIFFUSION WITH LIGHT-GENERATING SOURCES

CROSS-REFERENCE TO RELATED APPLICATIONS

This application is a continuation of and claims priority to U.S. patent application Ser. No. 14/759,408, filed Jul. 7, 2015, entitled "Light Diffusion with Edge-Wrapped Light-Generating Sources, which is a U.S. national stage application of and claims priority to international patent application PCT/US15/31254, filed May 15, 2015, entitled "Light Diffusion with Light-Generating Sources," which claims priority to U.S. Provisional Application No. 61/994,021, filed May 15, 2014, entitled "Light Diffusion of Lighted Substrate," the entirety of each of which is incorporated herein by reference.

BACKGROUND

Typically, light diffusion involves the scattering of direct light by making it pass through a translucent material and/or by bouncing it off a semi-reflective surface. Photographers often create a "softer" light by using light diffusion.

Light beams produced by a bright light source like the sun or a light bulb are straight. Diffused light beams pass through something that is not transparent or bounce off another surface. Diffused light beams scatter in different directions. This diffused light is softer and will not seem as harsh to the viewer as the direct light from the bright light sources.

The light beams are also called light rays. Light rays are composed of light photons. Light diffusion may be described as photon diffusion.

Thus, photon diffusion is when photons travel through a material without being absorbed, but rather undergoing repeated scattering events. These scattering events change the direction of the path of the photons. The path of any given photon is then effectively a random walk. A large ensemble of such photons can be said to exhibit diffusion in the material.

A light-emitting diode (LED) is a two-lead semiconductor light source that emits light. Since their introduction in the early 1960s, they have become increasingly more effective and popular. LED light illuminates displays, such as computer monitors, televisions, tablet computers, and touch-screen smartphones.

Unfortunately, a LED produces a pinpoint of light (i.e., point light) that produces an undesirable "hot spot". Conversely, desirable displays have soft and even illumination.

In response, conventional diffusion technologies exist to ameliorate hot spots. The conventional diffusion technology typically involves layering of multiple and often differing films or substrates to refract and/or reflect the light beam from the pinpoint light sources. However, the relentless drive to ever thinner electronic devices makes the volume occupied by diffusers increasingly more precious. Consequentially, there is becoming less and less room in state-of-the-art electric devices for conventional diffusers.

BRIEF DESCRIPTION OF THE DRAWINGS

The Detailed Description references the accompanying figures. In the figures, the left-most digit(s) of a reference number identifies the figure in which the reference number first appears. The same numbers are used throughout the drawings to reference like features and components.

DETAILED DESCRIPTION

Techniques and devices provide uniform illumination, especially backlighting. Such backlighting can be used for many devices, such as displays or keyboards. In particular, the technology disclosed herein utilizes substrates that have light-generating sources with new and heretofore unachievable properties to backlight devices. A plurality of light-generating sources are positioned at a plurality of differing angles. Combined with diffusive layers or diffusive properties of a lightguide the light-generating sources create a soft, even backlighting in a thinner embodiment than conventional techniques. In one example embodiment, a substrate that has light-generating sources, and is wrapped around an edge of a lightguide.

Seemingly, all electronic devices are getting smaller and smaller. Computing devices are getting thinner and thinner. The thinness of display devices are constrained by many factors. Often, one of the factors that limits the thinness of such display devices are the lighting elements of the display devices. The thinness of the conventional display devices have been pushed to the limit of what conventional approaches can allow.

As these devices are getting thinner, often the physical size of the light-generating sources (e.g., light-emitting diodes (LEDs) is becoming a limiting factor in the thinness of devices. Often LEDs are used to edge-lit a lightguide. This is done this way to avoid having the LEDs in the directly line-of-sight of a display (or similar device). Doing this can create harsh points of light. The technology described herein describes orienting light-generating sources (such as LEDs) in a variety of manners to utilize reflective and diffusive properties in lightguides. These novel techniques enable the devices, for example display devices, to be thinner, and to have a soft, even backlighting. Thus, these display devices are both thin and do not have harsh points of light.

Implementations described herein utilize a thin and flexible substrate on which light-generated sources (e.g., LEDs) are operatively connected to a circuitry on the substrate. In some implementations, the lightguide acts as the substrate. In still other implementations, the light-generating sources are disposed within the lightguide. The substrate is 0.1 to 0.15 mm thick or perhaps thinner. In some implementations, the substrate has a thickness of 0.07 to 0.2 mm (i.e., 70 to 200 microns)

Figure 1A:
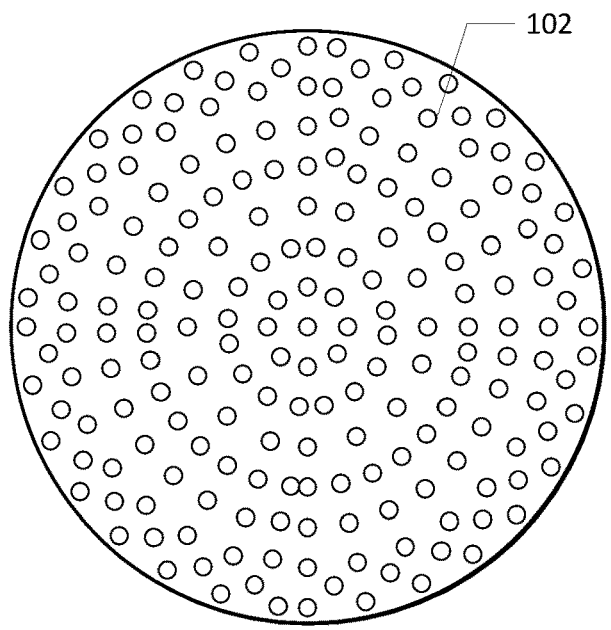
FIG. 1A is a diagram illustrating a plurality of points of light produced by a plurality of LEDs, before an example system of the subsequent figures is applied to a plurality of LEDs.

To further emphasize this advantage over conventional techniques, FIG. 1A demonstrates an example of the failing of light-generating sources arranged in a conventional backlighting manner. As shown, the light-generating sources generate several harsh points of light 102. These points of light are undesirable to a user of a display device, as they distract from the information presented by the display device.

Figure 1B:
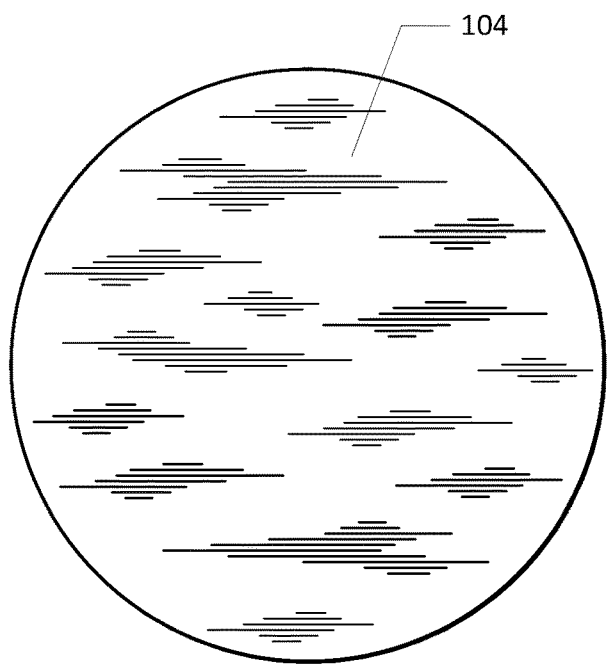
FIG. 1B is a diagram illustrating a plurality of points of light, after an example system of the subsequent figures is applied to the LEDs of FIG. 1A.

Conversely, FIG. 1B demonstrates an example of the novel technology described herein. Rather than the harsh points of light 102, FIG. 1B shows a soft, even backlighting 104 of the display device. Soft, even backlighting can decrease viewing strain.

Exemplary Lightplates

Figure 2:
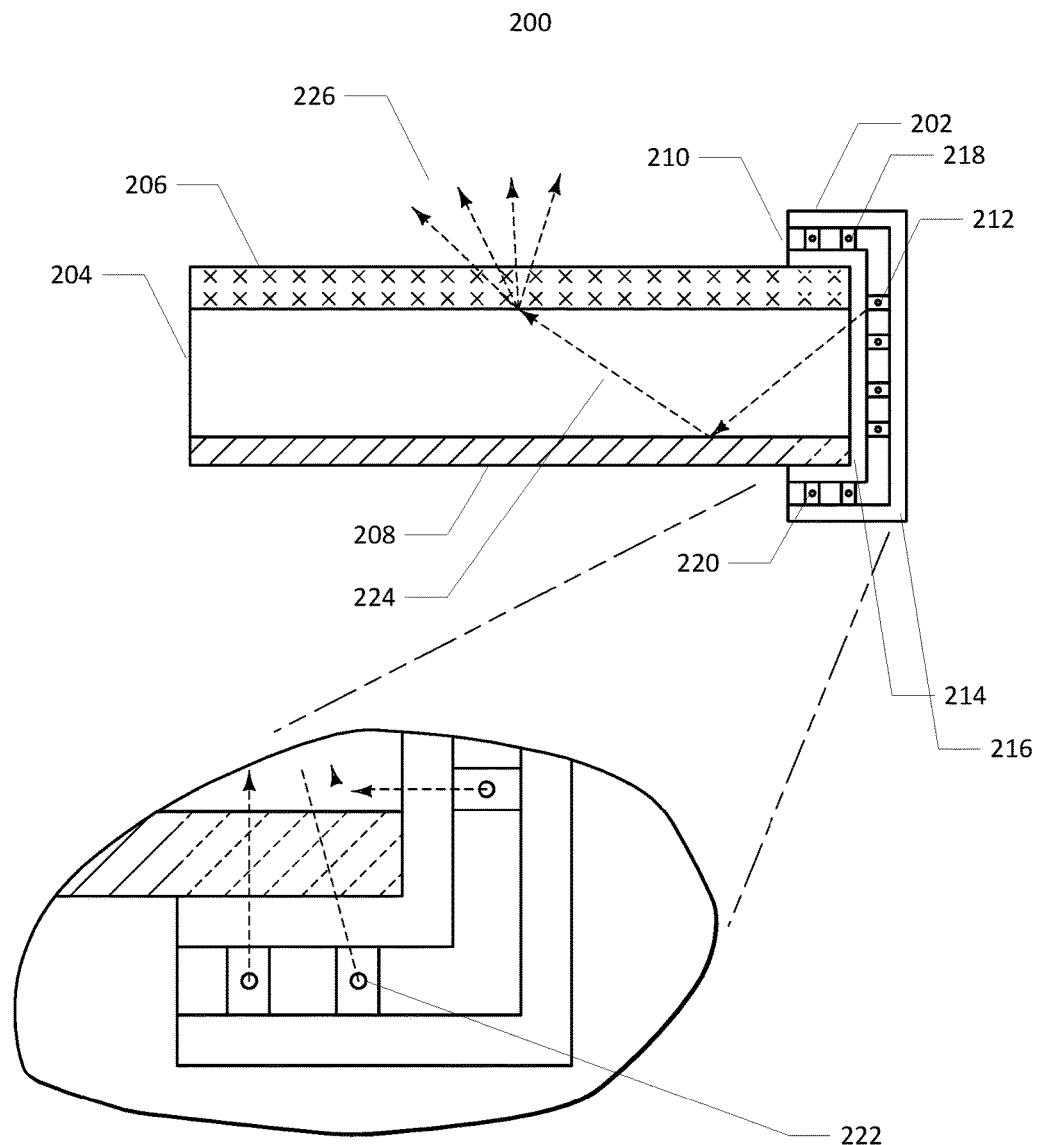
FIG. 2 is a block diagram illustrating an example system implementing a backlighting apparatus, showing some detail of a substrate wrapped around an edge of a lightguide, according to an implementation.

FIG. 2 illustrates a system 200 implementing a backlighting apparatus, showing some detail of a substrate wrapped around an edge of a lightguide. For example, substrate 202 is wrapped around an edge of lightguide 204. Lightguide 204 includes diffusive side 206 and non-diffusive side 208. Since substrate 202 is wrapped around the edge of lightguide 204, substrate 202 covers a portion of diffusive side 206 and a portion of non-diffusive side 208.

Substrate 202 has several layers attached thereto. Light layer 210 includes light-generating source (LGS) 212. Layers 214 and 216 include conductive traces. Conductive traces 214 and 216 electrically link light-generating source 212 to a power source. The power source enables light-generating source 212 to emit light by becoming electrically charged.

In one or more implementations, the light layer 210 on the substrate 202 has several LEDs (e.g., printable light-emitting diodes (pLEDs)), that emit light into the lightguide 204 at different sides (e.g., surfaces/sides and edge) of the lightguide. The orientation of the LGSs relative to the lightguide 204 (e.g., surface/side or edge) create a plurality of differing angles at which the light enters the lightguide. For example, light-generating source 218 is oriented perpendicular to diffusive side 206. Further, light-generating source 220 is oriented perpendicular to non-diffusive side 208. Also, light-generating source 212 is oriented parallel to diffusive side 206 and non-diffusive side 208 (or perpendicular to the edge). Thus, light-generating source 218, light-generating source 220, and light-generating source 212 are all oriented at different angles from each other.

Herein, references to LGSs being oriented to perpendicular to a surface/side or an edge mean that the LGSs are oriented so that the center of the light beam emitted from a LGS is generally perpendicular to the surface/side or edge. Generally, perpendicular includes angles that are +/−25% from the literal perpendicular.

The light rays generated from the light-generating sources are generally directed into to the surface/side or edge of the lightguide (depending upon to which one that it is directed). For example, light emitted from the light-generating source 212 is directed towards the edge of the lightguide. Thus, it enters the lightguide via the edge of the lightguide.

The light from the LGSs typically enters the surface/side or edge of the lightguide at an angle perpendicular to that surface/side or edge. However, light beam emanating from the LGSs spreads out and proceeds at angles other than exactly perpendicular. For example, light-generating source 222 emits light into lightguide 204 at an angle that is not perpendicular to non-diffusive side 208. Regardless, the direction of the light beam is towards the surface/side or edge to which it is directed/oriented.

To create the diffused light, the LGSs emit light into lightguide 204, the light is reflected in lightguide 204, and then the light is emitted from lightguide 204 as diffused light. For example, LGS 212 emits light ray 226 into lightguide 204. Light ray 224 reflects off non-diffusive side 208, enters diffusive side 206, and then is emitted as diffused light 228.

Diffusive side 206 of lightguide 204 is imbued with diffusive properties. Diffusive side 206 may, for example, contain etchings that diffuse light that enters diffusive side 206. Etchings may be any structure or property that would diffuse light passing through diffusive side 206.

Non-diffusive side 208 of lightguide 204 has different properties than diffusive side 206. For example, non-diffusive side 208 may be reflective. To imbue non-diffusive side 208 with reflective properties, non-diffusive side 208 may be coated with a reflective material. A portion of non-diffusive side may not include the reflective coating. The portion of non-diffusive side may include etchings similar to those described above regarding diffusive side 206.

The portions of lightguide 204 under edge-wrapped substrate 202 may not include diffusive and non-diffusive properties of diffusive side 206 and non-diffusive side 208. Thus, light emitted from the LGSs may enter the lightguide unaltered. Optionally, the diffusive properties of the portion of diffusive side 206 under edge-wrapped substrate 202 may be retained to create more diffused light in lightguide 204. Further, the portion of non-diffusive side 206 under edge-wrapped substrate 202 may include diffusive properties to create more diffused light in lightguide 204.

A conventional edge-lit lightguide has several LEDs lined upon along the edges of a lightguide. The LEDs are oriented to direct their light into the edge. With this conventional arrangement, the light from the edge-mounted LEDs enters only along the edge of the lightguide. In fact, to improve the transfer efficiency, it is common to bridge the light path between the edge-mounted LEDs and the edge of the lightguide with lens (e.g., prisms or Fresnel lens). Often these LEDs and light bridges are thicker than the lightguide's themselves. Thus, the LEDs are often the limiting factor on thinness with a conventional edge-mounted LED arrangement of a backlighting approach. Also, with the conventional approach, the light at the very edge of the lightguide is not yet diffused as it enters the edge of the lightguide.

Unlike a conventional edge-lit arrangement, the implementation of the new technology described herein maximizes light-transfer efficiency. The substrate is thin and flexible. It has LEDs are that smaller than the thickness of the lightguide. The substrate is directly attached (e.g., adhered, mounted, pressed, etc.) to the edge of the lightguide and wraps around to portion of each surface. Because of this, the LEDs pressed immediately against the surface/edge of the lightplate. There is no need for lens or any other light bridge.

With this new arrangement, light from the various LEDs enter into the lightguide from its edge as well as from at least a portion of one or both surfaces immediately adjacent to the edge. Because of this light at the edge of the lightguide is immediately and quickly diffused.

In some implementations, the LGS and circuitry (e.g., conductive traces) are printed onto the thin flexible substrate using pLEDs. In other implantations, the LGS is a tiny LED (e.g., 20-40 microns in diameter) placed and fixed onto the substrate with conductive links connecting them to a potential power source.

Figure 3:
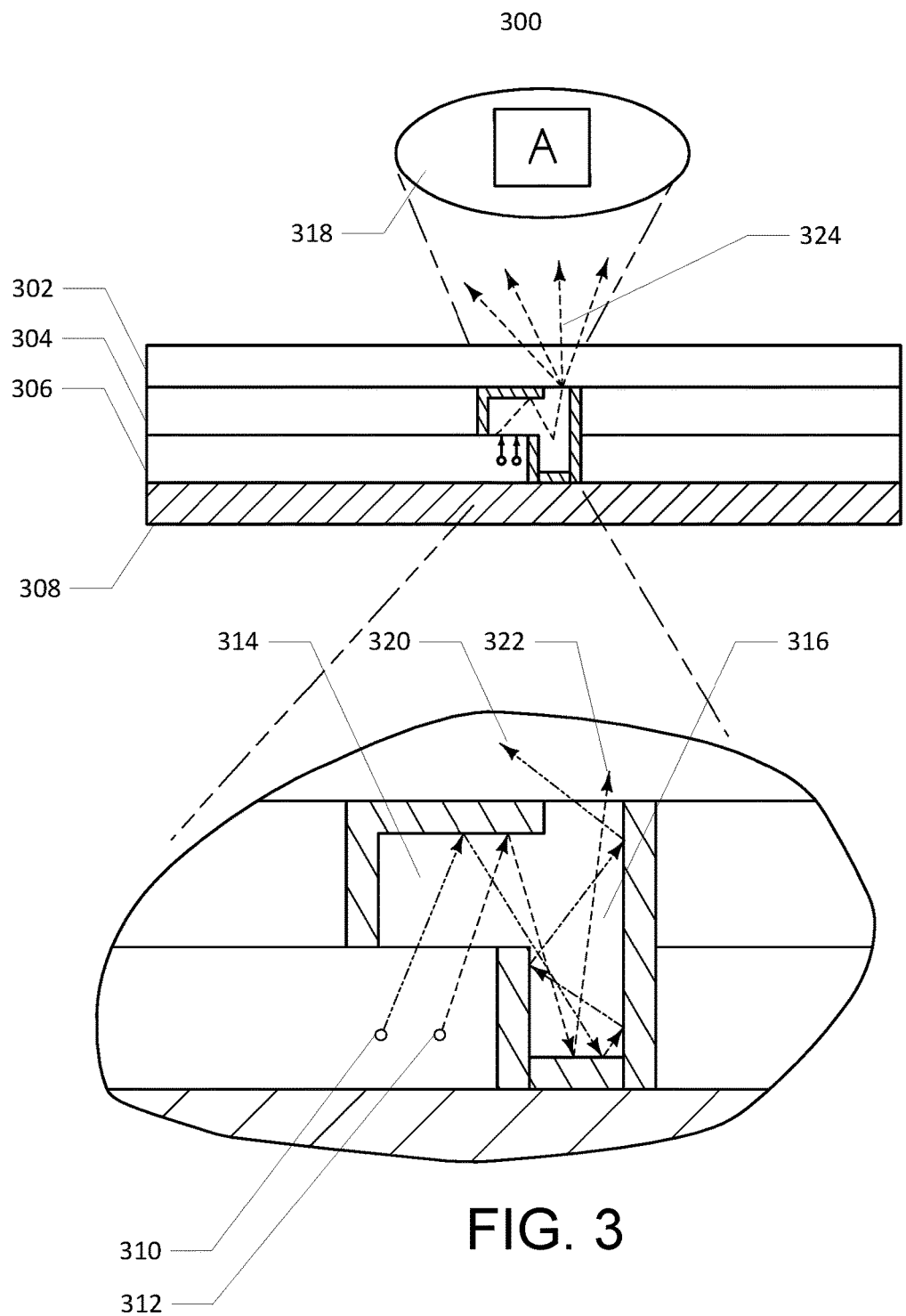
FIG. 3 is a block diagram illustrating an example system implementing a keyboard assembly, showing some detail of a deadfront keyboard, according to an implementation.

FIG. 3 is a block diagram illustrating system 300 implementing a keyboard assembly, showing some detail of a deadfront keyboard. For example, system 300 includes deadfront keyboard overlay layer 302, sensor layer 304, light layer 306, and backer layer 308. Light layer 306 has LGSs 310 and 312. Anteroom 314 is included in sensor layer 304 and lightroom 316 is included in light layer 306 and sensor layer 304. LGSs 310 and 312 emit light into anteroom 314. Light passes from anteroom 314 into lightroom 316, and then escapes through deadfront keyboard overlay layer 302 to illuminate key pattern 318. The light that illuminates key pattern 318 is not harsh points of light, but rather a soft, even backlighting.

The layers of the deadfront keyboard are positioned one on top of the other. Deadfront keyboard overlay layer 302 is on top. Deadfront keyboard overlay layer 302 includes key patterns, for example key pattern 318 that shows the letter "A". Key pattern 318 is not visible when system 300 is turned off. Key pattern 318 is typically not depressable. Optionally, system 300 may provide some manner of acknowledgment to a user when a key is pressed, such as a change in illumination of key pattern 318, for example highlighting key pattern 318, or a sound. When LGSs 310 and 312 are enabled, key pattern 318 becomes visible.

Sensor layer 304 is located under deadfront keyboard layer 302. Sensor layer 304 includes anteroom 314. Sensor layer 304 also includes mechanisms to detect that a key, such as key pattern 318, has been pressed. Such a mechanism may be, for example, resistance or capacitive sensing.

Anteroom 314 in sensor layer 304 is positioned above LGSs 310 and 312. Light-generating sources emit light rays 320 and 322 into anteroom 314. Anteroom 314 may be composed of air, transparent material, translucent material, or any other material that will enable emitted light rays 320 and 322 to pass through anteroom 314. Anteroom 314 may be surrounded by reflective material. This reflective material may be similar to material included in non-diffusive side 208. Emitted light rays 320 and 322 reflect off the sides of anteroom 314, and exit anteroom 314 into lightroom 316.

Light layer 306 is positioned under sensor layer 304. Light layer 306 includes LGSs 310 and 312 and lightroom 316.

LGSs 310 and 312 are similar to LGSs 212, 218, 220, and 222. LGSs 310 and 312 are operatively linked to a light driver, and the light driver is configured to drive the LGSs 310 and 312. For example, the light driver may be a power source and the light driver may be operatively linked to LGSs 310 and 312 via structures similar to conductive traces 214 and 216.

Lightroom 316 is configured to receive emitted light rays 320 and 322 from anteroom 314. Lightroom 316 may be composed of air, transparent material, translucent material, or any other material that will enable emitted light rays 320 and 322 to pass through lightroom 314. Lightroom 314 may be surrounded by reflective material. This reflective material may be similar to material included in non-diffusive side 208. Emitted light rays 310 and 312 reflect off the sides of lightroom 316, and illuminate key pattern 318 with diffused light 324. Emitted light rays 320 and 322 exit system 300 through deadfront keyboard overlay layer 302. Diffused light 324 is not harsh points of light, but rather provides a soft, even backlighting.

Backer layer 308 is located under light layer 306. Backer layer 308 may include reflective material, similar to material included in non-diffusive side 208. The reflective material of backer layer 308 keeps emitted light rays 320 and 322 in lightroom 316 until emitted light rays 320 and 322 exit lightroom 316 through deadfront keyboard overlay layer 302 and illuminate key pattern 318.

Figure 4:
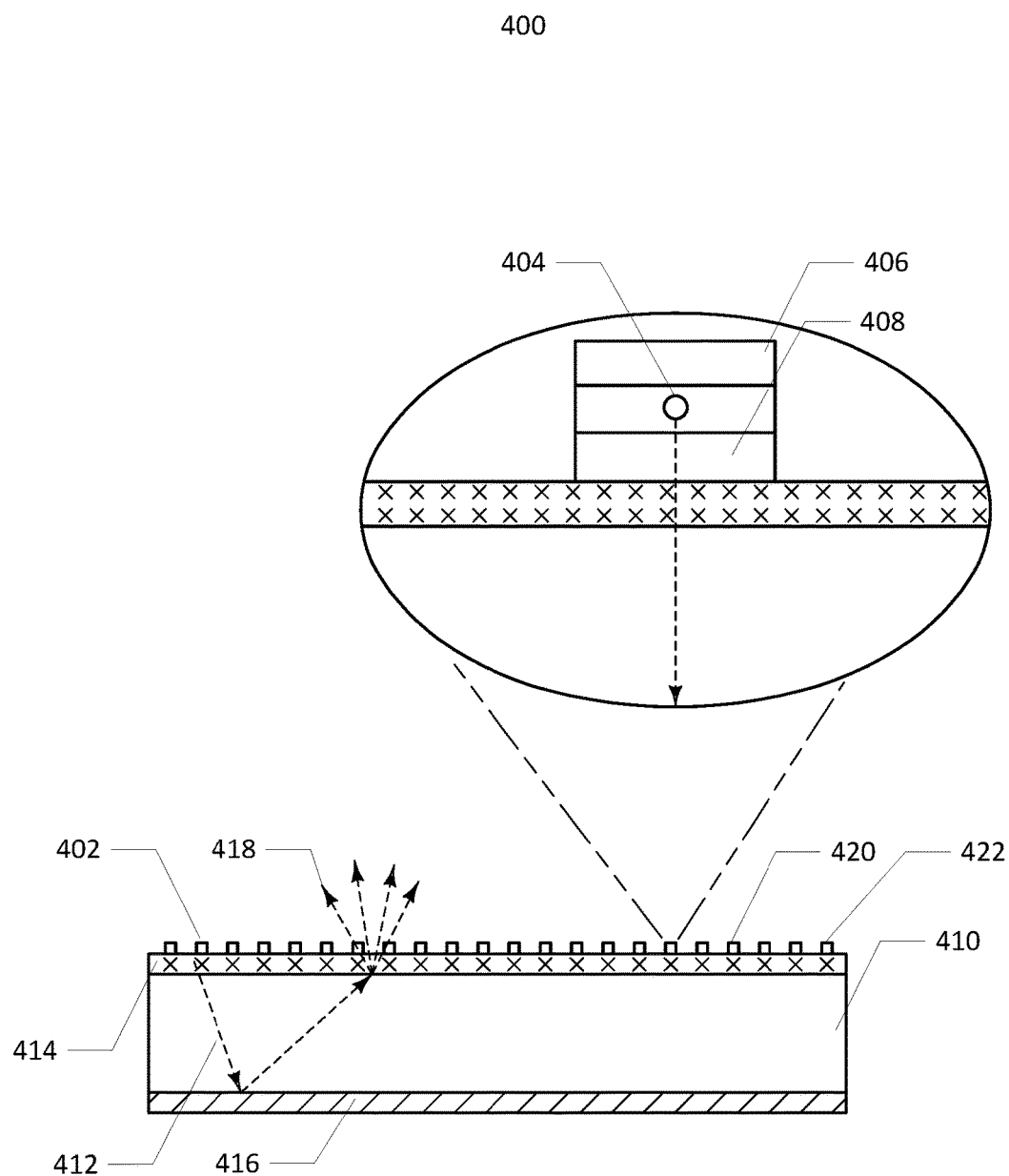
FIG. 4 is a block diagram illustrating an example system implementing a backlighting apparatus, showing some detail of a substrate that has light-generating sources disposed at a diffusive side, according to an implementation.

FIG. 4 illustrates a system 400 implementing a backlighting apparatus, showing some detail circuitry with light-generating sources disposed at a diffusive side of a lightguide. For example, circuit 402 has LGS 404 with conductive traces contained within layers 406 and 408.

Similar to the system 200, LGS 404 is oriented so that LGS 404 emits light into lightguide 410. As depicted, conductive trace 408 is translucent or transparent to allow light to pass therethrough. The emitted light ray 412 passes through diffusive side 414 of lightguide 410. The emitted light ray 412 reflects off non-diffusive side 416 of lightguide 410 back into lightguide 410 towards diffusive side 414. Diffusive side 414 diffuses emitted light ray 412, resulting in diffused light 418 emitting from lightguide 410. Diffused light 418 is not harsh points of light, but rather provides a soft, even backlighting for system 400.

Rather than using a single-purpose substrate to print/place the circuit thereon, the lightguide itself acts as the substrate for the circuit. More particularly, the circuits (e.g., 402, 420, and 422) are printed/placed on the diffusive side 414. As depicted, the LGS 404 may contain a single LGS. Or it may contain a plurality of such sources.

Figure 5:
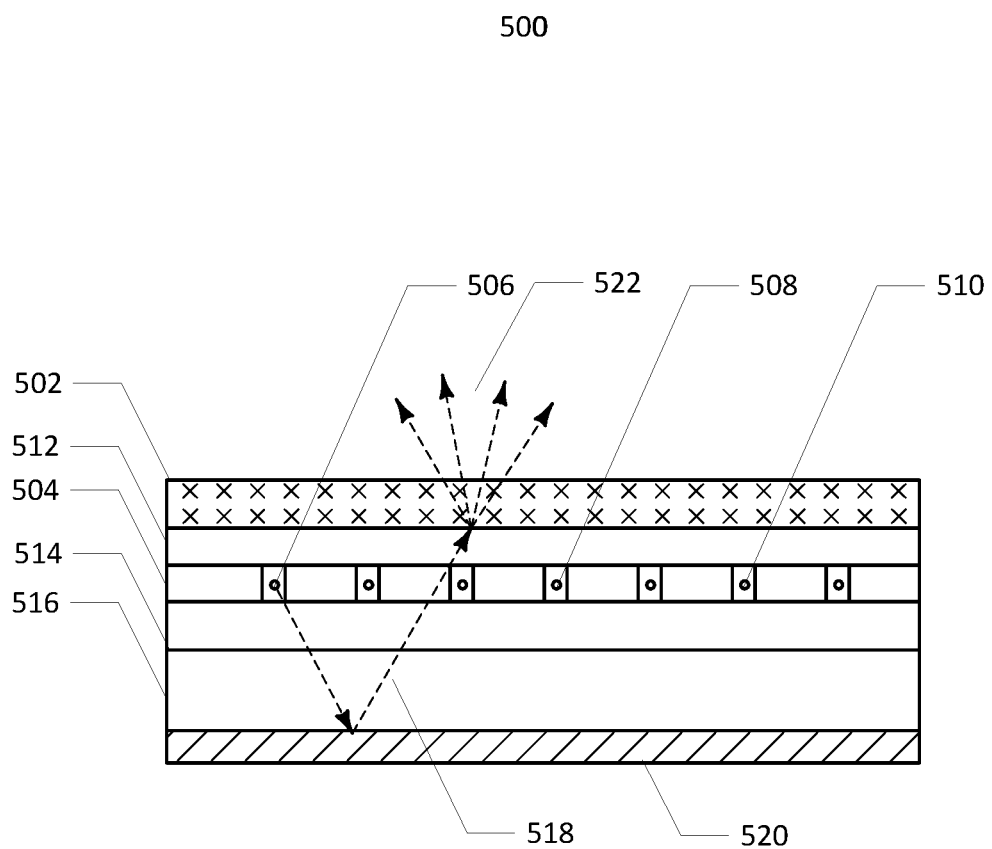
FIG. 5 is a block diagram illustrating an example system implementing a backlighting apparatus, showing some detail of light-generating sources configured to emit light into a lightplate, according to an implementation.

FIG. 5 is a block diagram illustrating a system 500 implementing a backlighting apparatus, showing some detail of LGSs configured to emit light into a lightplate, according to an implementation. For example, rather than substrate 402 disposed at diffusive side 502, a LGS layer 504 including LGSs 506-510 and conductive layers 512 and 514 may be included in system 500.

Similar to system 200, LGS 506 is oriented so that LGS 506 emits light into lightplate 516. The emitted light ray 518 passes through translucent or transparent conductive trace 514 and lightplate 516. The emitted light ray 518 reflects off non-diffusive side 520 of system 500 back into lightplate 516 towards diffusive side 502. Emitted light ray passes through lightplate 516, conductive traces 512 and 514, and light-generating source layer 504. Diffusive side 502 diffuses emitted light ray 518, resulting in diffused light 522 emitting from system 500. Diffused light 522 is not harsh points of light, but rather provides a soft, even backlighting for system 500.

Figure 6:
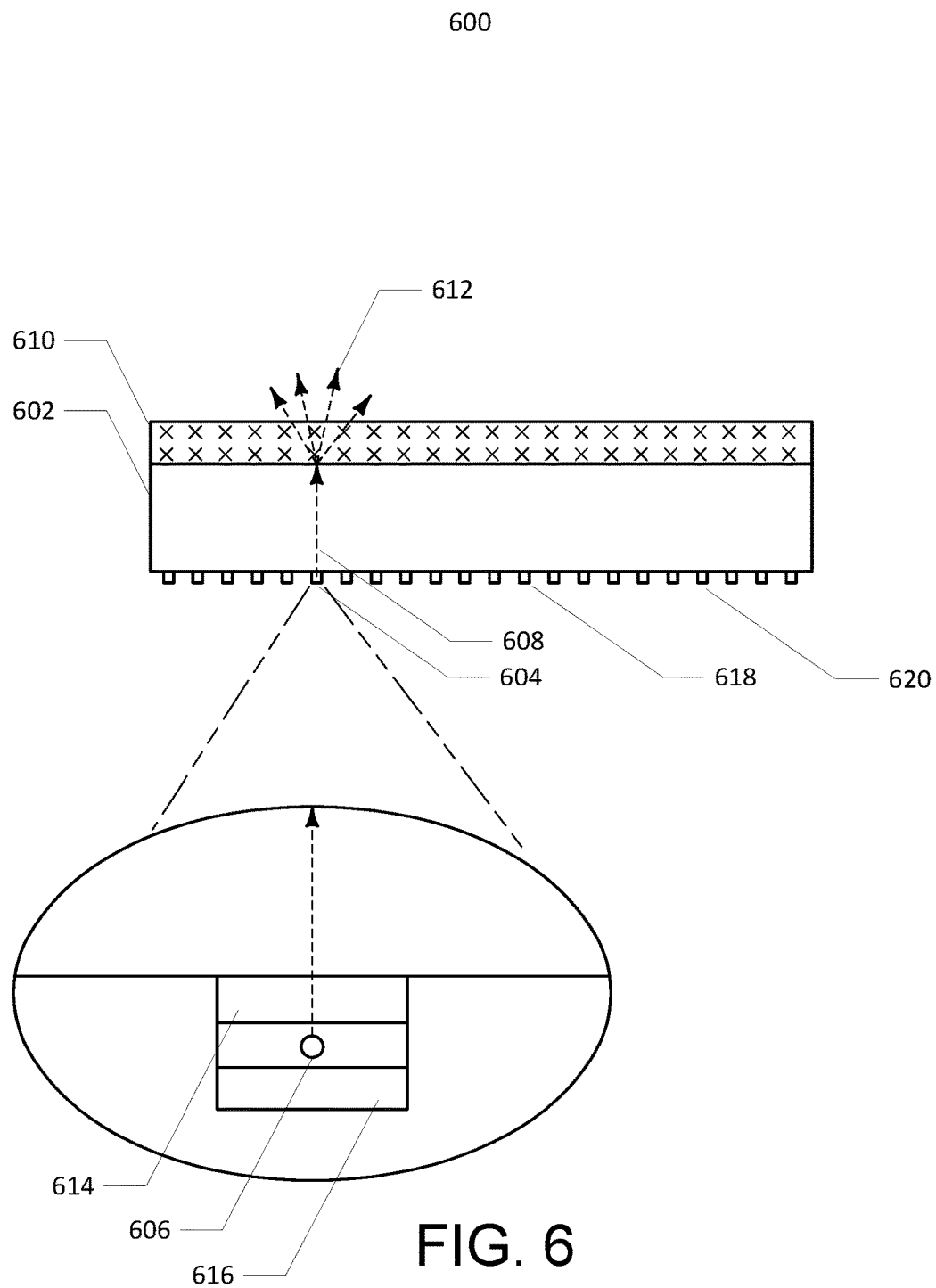
FIG. 6 is a block diagram illustrating an example system implementing a backlighting apparatus, showing some detail of a substrate that has light-generating sources disposed opposite a prismatic diffusion layer, according to an implementation.

FIG. 6 is a block diagram illustrating a system 600 implementing a backlighting apparatus, showing some detail of a circuitry including LGSs disposed opposite a prismatic diffusion layer. For example, lightguide 602 includes a circuitry 604 similar to circuitry 402. LGS 606 of circuit 604 emits light ray 608 into lightguide 602. Nano-resolution tools at prismatic diffusion layer 610 of lightguide 602 diffuse emitted light ray 608, resulting in diffused light 612 emitting from lightguide 602. Diffused light 612 is not harsh points of light, but rather provides a soft, even backlighting for system 600.

Nano-resolution tools include ultrathin lenses, embossed areas, and other structures that would occur to one of ordinary skill in the art. Nano-resolution tools may diffract, refract, or diffuse emitted light ray 612.

Substrate 604 also has conductive traces 614 and 616. Conductive traces 614 and 616 are similar to conductive traces 406 and 408.

Rather than using a single-purpose substrate to print/place the circuit thereon, the lightguide itself acts as the substrate for the circuit. More particularly, the circuits (e.g., 602, 618, and 620) are printed/placed on the non-diffusive side. As depicted, the LGS 606 may contain a single LGS or it may contain a plurality of such sources.

Figure 7:
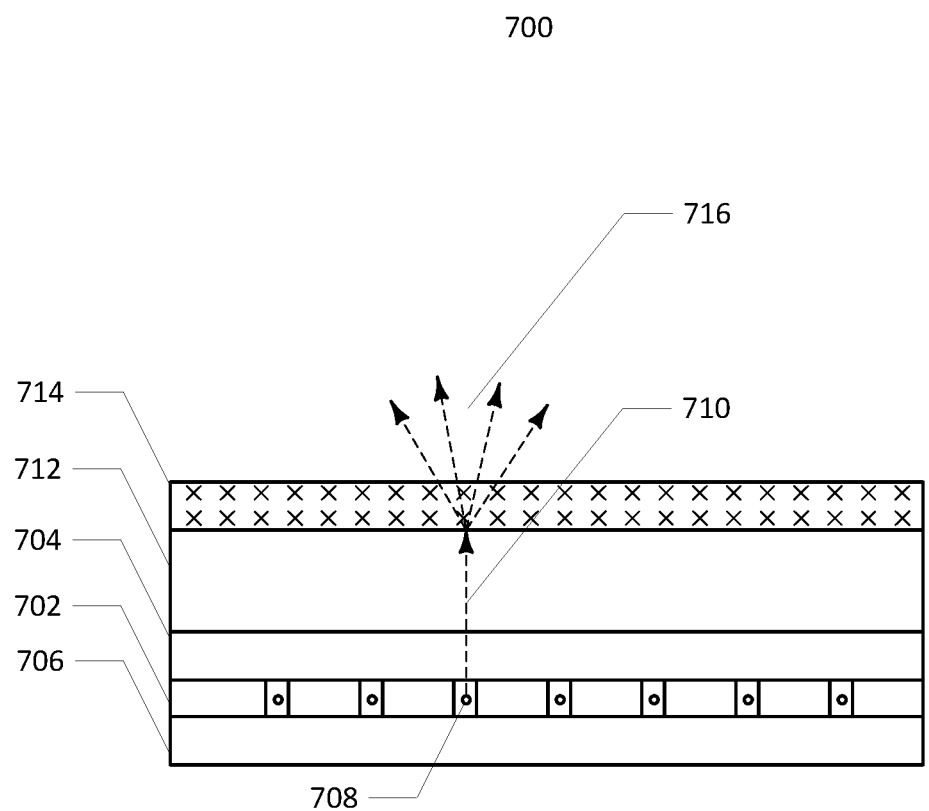
FIG. 7 is a block diagram illustrating an example system implementing a backlighting apparatus, showing some detail of light-generating sources configured to emit light into a lightplate and a prismatic diffusion layer, according to an implementation.

FIG. 7 is a block diagram illustrating a system 700 implementing a backlighting apparatus, showing some detail of light-generating sources configured to emit light into a lightplate and a prismatic diffusion layer. For example, system 700 includes a LGS layer 702 and conductive trace layers 704 and 706, similar to light-generating source layer 504 and conductive trace layers 512 and 514. LGS 708 emits light ray 710 into lightplate 712. Emitted light ray 710 passes through conductive trace 704, lightguide 712, and prismatic diffusion layer 714. Nano-resolution tools at prismatic diffusion layer 714 of system 700 diffuse emitted light ray 710, resulting in diffused light 716 emitting from system 700. Diffused light 716 is not harsh points of light, but rather provides a soft, even backlighting for system 700. Nano-resolution tools of system 700 are similar to nano-resolution tools of system 600.

The exemplary systems of FIGS. 2-7 may also be constructed as an article of manufacture. An article of manufacture exhibits similar properties to systems 200, 300, 400, 500, 600, and 700.

Light-Generating Sources

As utilized herein, the term "light-generating sources" (LGS) refers to any device that emits electromagnetic radiation within a wavelength regime of interest, for example, visible, infrared or ultraviolet regime, when activated, by applying a potential difference across the device or passing a current through the device. Examples of LGSs include solid-state, organic, polymer, laser diodes or other similar devices as would be readily understood. The emitted radiation of a LGS may be visible, such as red, blue or green, or invisible, such as infrared or ultraviolet. A LGS may produce radiation of a spread of wavelengths. Unless the context states otherwise, a reference to a LGS may include multiple LGSs, each emitting essentially the same or different wavelengths. In some embodiments, a LGS is an unpackaged LED (e.g., LED die).

To promote thinness and smallness, many implementations contemplate the use of unpackaged LEDs (e.g., LED dies) instead of packaged LEDs. Further, the individual LGS (e.g., unpacked LED) contemplated have a diameter between 10 to 50 microns and a height between 5 to 20 microns. In some implementations, the light-generating component has a diameter between about 20 to 30 microns and a height between about 5 to 15 microns. In some implementations, the size of the individual LGS (e.g., unpackaged LED) is 25 to 50 microns.

An example of a LGS that is contemplated to be used with the technology described herein is described in U.S. Pat. No. 8,415,879, which is titled "Diode for a Printable Composition," which is incorporated by reference herein. These LEDs are printed, thus they are called pLEDs herein.

Each pLED has a diameter between 10 to 50 microns and a height between 5 to 20 microns. In some implementations, the light-generating component has a diameter between about 20 to 30 microns and a height between about 5 to 15 microns.

Using the pLEDs, each group of LGSs may contain about two-thousand sources in some implementations. In other implementations, a group may contain as much as five thousand source.

Implementations of the technology described herein that use the pLEDs involve a disposition, for example placing the pLEDs through printing or spraying, of pLEDs that are suspended in a liquid or gel, for example ink. Indeed, the disposition of pLEDs may be accomplished on a convention printing press or screen press.

The structure created by disposing the pLEDs may also be called a printed "circuit" In some implementations, the printed circuit is a thin stack of layers on a substrate, which is a thin film. That film is 0.1 to 0.15 mm thick or perhaps thinner. In some implementations, the film has a thickness of 0.07 to 0.2 mm. This film of material may be a polyester film or other suitable material. The combined stack is only microns thicker than the film itself.

Additional and Alternative Implementation Notes

Any suitable type of technology can be utilized to implement conductive traces. Examples of suitable technologies include (by way of example and not limitation): silver, carbon-like material, or any other material for conducting electricity that would occur to one of ordinary skill in the art. The conductive traces may be composed of material that is reflective, opaque, or otherwise not translucent nor transparent. The conductive traces may include conductive nanofibers. Conductive traces may be created using conventional conductive ink or other similar processes. Conductive inks may be classed as fired high solids systems or PTF polymer thick film systems that allow circuits to be drawn or printed on a variety of substrate materials such as polyester to paper. These types of materials usually contain conductive materials such as powdered or flaked silver and carbon like materials. While conductive inks can be an economical way to lay down a modern conductive traces, traditional industrial standards such as etching of conductive traces may be used on relevant substrates Any suitable type of technology can be utilized to implement the etchings of diffusive side 206. Examples of suitable technologies include (by way of example and not limitation): a material, such as phosphor, that coats diffusive side 206, structures in diffusive side 206, or molds attached to diffusive side 206. Structures in diffusive side 206 may include ablations, excisions, abscissions, cuts, engravings, imprints, incisions, corrosions, abrasions, dissolutions, erosions, oxidations, or any other structure that would occur to one of ordinary skill in the art. Molds attached to or integral with diffusive side 206 may include protrusions, nodules, bumps, convexities, ridges, bulges, or any other structure that would occur to one of ordinary skill in the art.

Any suitable type of technology can be utilized to implement the mechanisms of sensor layer 304. Examples of suitable technologies include (by way of example and not limitation): resistive, capacitive, or contact switches, or other mechanisms that will occur to those of ordinary skill in the art. Sensor layer 304 may also be composed of a web or membranes of circuitry, or other structures that will occur to those of ordinary skill in the art.

Any suitable type of technology can be utilized to implement the nano-resolution tools. Examples of suitable technologies include (by way of example and not limitation): Nano-resolution tools include structures such as linear diffusers, industrex, solite softening diffusers, frosted diffusers, or others that will occur to those of ordinary skill in the art.

In the above description of exemplary implementations, for purposes of explanation, specific numbers, materials configurations, and other details are set forth in order to better explain the present invention, as claimed. However, it will be apparent to one skilled in the art that the claimed invention may be practiced using different details than the exemplary ones described herein. In other instances, well-known features are omitted or simplified to clarify the description of the exemplary implementations.

The inventors intend the described exemplary implementations to be primarily examples. The inventors do not intend these exemplary implementations to limit the scope of the appended claims. Rather, the inventors have contemplated that the claimed invention might also be embodied and implemented in other ways, in conjunction with other present or future technologies.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts and techniques in a concrete fashion. The term "techniques," for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

Other Ways of Describing Implementations

Below is a listing of different ways to describe the implementations introduced here:

Example A; An implementation of a backlighting apparatus comprising:
a translucent lightguide including a diffusive side and a non-diffusive side, the diffusive side and the non-diffusive side disposed at opposite sides of the lightguide;
a substrate wrapped around an edge of the lightguide and disposed at the lightguide at both the diffusive side and the non-diffusive side, such that the substrate covers a portion of the diffusive side and a portion of the non-diffusive side;
a plurality of light-generating sources of the substrate configured to emit light into the lightguide through the edge and at least one side of the lightguide;
a reflective coating disposed at the non-diffusive side configured to reflect the emitted light from the light-generating sources back into the lightguide towards the diffusive side.

An implementation of backlighting apparatus of Example A that further comprising etchings of the diffusive side configured to diffuse the reflected light and emit the diffused light out of the lightguide.

An implementation of backlighting apparatus of Example A, wherein the plurality of light-generating sources include light-emitting semiconductors that each have a cross-section with a maximum height between 5 to 20 microns and a diameter between 10 to 50 microns.

An implementation of backlighting apparatus of Example A, wherein the light-generating sources include light-emitting diodes.

An implementation of backlighting apparatus of Example A, wherein the substrate is flexible and thin, having a thickness of 70 to 200 microns.

An implementation of backlighting apparatus of Example A, wherein the plurality of light-generating sources are oriented to cast its light in directions that include perpendicular to the diffusive side, perpendicular to the non-diffusive side, and parallel to the diffusive side and the non-diffusive side.

An implementation of backlighting apparatus of Example A, wherein the emitted light enters the lightguide through the diffusive side, the non-diffusive side, and the edge of the lightguide.

Example B: An implementation of a keyboard assembly comprising:
a deadfront keyboard overlay layer including a key pattern that is configured to be illuminated by a plurality of light-generating sources;
a sensor layer configured to determine selection of a key indicated by the key pattern, the sensor layer being positioned under the overlay layer, the sensor layer having an anteroom defined therein, the anteroom including reflective material;
a light layer that is positioned under the sensor layer, the light layer having one or more light-generating sources configured to emit light into the anteroom of the sensor layer;
the sensor layer and the light layer having a lightroom defined therein and positioned underneath the key pattern, the lightroom including reflective material;
a light driver operatively linked to the one or more of light-generating sources and configured to drive the one or more of light-generating sources.

An implementation of keyboard assembly of Example B, wherein when the light driver drives the one or more light-generating sources, the key pattern is illuminated by diffused light that originates from the one or more light-generating sources.

An implementation of keyboard assembly of Example B, wherein when the light driver drives the one or more light-generating sources, the one or more light-generating sources emit light into the anteroom, the emitted light reflects off the reflective material of the anteroom into the lightroom, therein the reflected light in lightroom escapes the lightroom via the key pattern of the deadfront keyboard overlay layer.

An implementation of keyboard assembly of Example B, wherein the anteroom and the lightroom are composed of material selected from a group consisting of air, transparent material, and translucent material.

An implementation of keyboard assembly of Example B, wherein the deadfront keyboard overlay layer includes an alphanumeric keyboard composed of a plurality of key patterns.

An implementation of keyboard assembly of Example B, wherein the key pattern is visible in response to the plurality of light-generating sources emitting light.

An implementation of keyboard assembly of Example B, wherein the plurality of light-generating sources include light-emitting semiconductors that each have a cross-section with a maximum height between 5 to 20 microns and a diameter between 10 to 50 microns.

An implementation of keyboard assembly of Example B 3, wherein the light-generating sources include light-emitting diodes.

An implementation of keyboard assembly of Example B, wherein light layer is composed of a flexible and thin surface lighted substrate, having a thickness of 70 to 200 microns.

Example C: An implementation of a backlighting apparatus comprising:
a lightplate including a diffusive side and a non-diffusive side, the diffusive side and the non-diffusive side disposed at opposite sides of the lightplate;
a plurality of light-generating sources affixed to at least one side of the lightguide, the light-generating sources being configured to emit light into the lightguide through the side of the lightguide to which it is affixed;
a reflective coating disposed at the non-diffusive side configured to reflect the emitted light from the light-generating sources back into the lightplate towards the diffusive side.

An implementation of a backlighting apparatus of Example C, further comprising etchings of the diffusive side configured to diffuse the reflected light and emit the diffused light out of the lightplate.

An implementation of a backlighting apparatus of Example C, wherein the plurality of light-generating sources include light-emitting semiconductors that each have a cross-section with a height between 5 to 20 microns and a diameter between 10 to 50 microns.

An implementation of a backlighting apparatus of Example C, wherein the plurality of light-generating sources include light-emitting diodes.

An implementation of a backlighting apparatus of Example C, wherein the plurality of light-generating sources are oriented to direct its emitted light into the lightguide and in a direction that is perpendicular to the diffusive side.

An implementation of a backlighting apparatus of Example C, wherein the emitted light enters the lightguide via the diffusive side.

An implementation of a backlighting apparatus of Example C, wherein the plurality of light-generating sources are oriented to direct its emitted light into the lightguide and in a direction that is perpendicular to the non-diffusive side.

An implementation of a backlighting apparatus of Example C, wherein the emitted light enters the lightguide via the non-diffusive side.

Example D: An Implementation of a backlighting apparatus comprising:
a translucent lightguide including a diffusive side and a non-diffusive side, the diffusive side and the non-diffusive side disposed at opposite sides of the lightguide;
a substrate that has a plurality of light-generating sources affixed to at least one side of the lightguide, the light-generating sources being configured to emit light into the lightguide through the side of the lightguide to which it is affixed;
a reflective coating disposed at the non-diffusive side, configured to reflect the emitted light from the light-generating sources back into the lightguide towards the diffusive side.

An implementation of a backlighting apparatus of Example D further comprising a etchings placed at a plurality of locations of the diffusive side, configured to diffuse the reflected light and emit the diffused light out of the lightguide.

An implementation of a backlighting apparatus of Example D wherein the plurality of light-generating sources include light-emitting semiconductors that each have a cross-section with a height between 5 to 20 microns and a diameter between 10 to 50 microns.

An implementation of a backlighting apparatus of Example D, wherein the plurality of light-generating sources include light-emitting diodes.

An implementation of a backlighting apparatus of Example D, wherein the plurality of light-generating sources are oriented to direct its emitted light in a direction that is perpendicular to the diffusive side.

An implementation of a backlighting apparatus of Example D, wherein the emitted light enters the lightguide via the diffusive side.

An implementation of a backlighting apparatus of Example D, wherein the plurality of light-generating sources are oriented to direct its emitted light in a direction that is perpendicular to the non-diffusive side.

An implementation of a backlighting apparatus of Example D, wherein the emitted light enters the lightguide via the non-diffusive side.

Example E: An Implementation of a backlighting apparatus comprising:
a lightguide including a prismatic diffusion layer;
a plurality of light-generating sources configured to emit light into the lightguide;
nano-resolution tools placed at a plurality of locations of the prismatic diffusion layer configured to diffuse the emitted light and pass the emitted light through the prismatic diffusion layer.

An implementation of a backlighting apparatus of Example E, wherein the nano-resolution tools are selected from a group consisting of lenses and embossed areas.

An implementation of a backlighting apparatus of Example E, wherein the prismatic diffusion layer is configured to perform operations on the emitted light selected from a group consisting of diffraction, refraction, and diffusion.

An implementation of a backlighting apparatus of Example E, wherein the prismatic diffusion layer includes structures selected from a group consisting of linear diffusers, industrex, solite softening diffusers, and frosted diffusers.

An implementation of a backlighting apparatus of Example E, wherein the plurality of light-generating sources include light-emitting semiconductors that each have a cross-section with a maximum height between 5 to 20 microns and a diameter between 10 to 50 microns.

An implementation of a backlighting apparatus of Example E, wherein the light-generating sources include light-emitting diodes.

An implementation of a backlighting apparatus of Example E, wherein the plurality of light-generating sources are oriented perpendicular to the prismatic diffusion layer.

An implementation of a backlighting apparatus of Example E, wherein the emitted light enters the lightguide via the prismatic diffusion layer.

Example F: An Implementation of a backlighting apparatus comprising:
a lightguide including a prismatic diffusion layer;
a substrate has a plurality of light-generating sources disposed at a side of the lightguide opposite the prismatic diffusion layer and configured to emit light into the lightguide;
nano-resolution tools placed at a plurality of locations of the prismatic diffusion layer configured to diffuse the emitted light and pass the emitted light through the prismatic diffusion layer.

An implementation of a backlighting apparatus of Example F, wherein the nano-resolution tools are selected from a group consisting of lenses and embossed areas.

An implementation of a backlighting apparatus of Example F, wherein the prismatic diffusion layer is configured to perform operations on the emitted light selected from a group consisting of diffraction, refraction, and diffusion.

An implementation of a backlighting apparatus of Example F, wherein the prismatic diffusion layer includes structures selected from a group consisting of linear diffusers, industrex, solite softening diffusers, and frosted diffusers.

An implementation of a backlighting apparatus of Example F, wherein the plurality of light-generating sources include light-emitting semiconductors that each have a cross-section with a maximum height between 5 to 20 microns and a diameter between 10 to 50 microns.

An implementation of a backlighting apparatus of Example F, wherein the light-generating sources include light-emitting diodes.

An implementation of a backlighting apparatus of Example F, wherein the plurality of light-generating sources are oriented perpendicular to the prismatic diffusion layer.

An implementation of a backlighting apparatus of Example F, wherein the emitted light enters the lightguide via the prismatic diffusion layer.

Example G: An Implementation of a backlighting apparatus comprising:
means for disposing a diffusive side and a non-diffusive side at opposite sides;
means for covering a portion of the diffusive side, a portion of the non-diffusive side, and an edge of the disposing means;
means for emitting light into the lightguide through the edge and at least one of the sides;
means for reflecting the emitted light from the light-generating sources back into the lightguide towards the diffusive side;
means for diffusing the reflected light and emitting the diffused light out of the lightguide.

An implementation of a backlighting apparatus of Example G, further comprising means for orienting the emitting means in a direction selected from a group consisting of perpendicular to the diffusive side, perpendicular to the non-diffusive side, and parallel to the diffusive side and the non-diffusive side.

An implementation of a backlighting apparatus of Example G, wherein the diffusing means are selected from a group consisting of material that coats the diffusive side, etchings in the diffusive side, and molds of the diffusive side.

Example H: An Implementation of a backlighting apparatus comprising:
a lightplate including a diffusive side and a non-diffusive side, the diffusive side and the non-diffusive side disposed at opposite sides of the lightplate;
a plurality of light-generating sources located inside the lightplate and between the diffusive and non-diffusive sides, the plurality of light-generating sources being configured to emit light in a direction towards the non-diffusive side;
a reflective coating disposed at the non-diffusive side configured to reflect the emitted light from the light-generating sources back into the lightplate towards the diffusive side.

An implementation of a backlighting apparatus of Example H, further comprising etchings of the diffusive side configured to diffuse the reflected light and emit the diffused light out of the lightplate.

An implementation of a backlighting apparatus of Example H, wherein the plurality of light-generating sources include light-emitting semiconductors that each have a cross-section with a height between 5 to 20 microns and a diameter between 10 to 50 microns.

An implementation of a backlighting apparatus of Example H, wherein the plurality of light-generating sources include light-emitting diodes.

What is claimed is:
1. A backlighting apparatus comprising:
a lightguide having a first side and a second side opposite the first side;
a substrate including a plurality of micro-LEDs distributed across a width of the substrate, the substrate wrapped around an edge of the lightguide, such that:
the substrate covers the edge, a portion of the first side, and a portion of the second side, and
at least two of the edge, the portion of the first side of the lightguide, or the portion of the second side of the lightguide, have at least one micro-LED of the plurality of micro-LEDs positioned on the substrate so as to emit light into the lightguide therethrough; and
a reflective coating disposed at the second side to reflect light emitted from the micro-LEDs back into the lightguide towards the first side.

2. The backlighting apparatus of claim 1, wherein at least one of the plurality of micro-LEDs has a cross-section with a maximum height between about 5 microns to about 20 microns and a diameter between about 10 microns to about 50 microns.

3. The backlighting apparatus of claim 1, wherein the substrate is flexible and has a thickness of about 70 microns to about 200 microns.

4. The backlighting apparatus of claim 1, wherein respective micro-LEDs of the plurality of micro-LEDs are oriented on the substrate to cast light in at least one direction of multiple directions including: perpendicular to the first side, perpendicular to the second side, or to the first side and the second side.

5. The backlighting apparatus of claim 1, wherein light emitted from the plurality of micro-LEDs enters the lightguide through each of the portion of the first side, the portion of the second side, and the edge of the lightguide.

6. The backlighting apparatus of claim 1, wherein light emitted via the edge of the substrate enters into the lightguide unaltered.

7. The backlighting apparatus of claim 1, wherein the first side includes etchings configured to diffuse the reflected light and emit diffused light out of the lightguide.

8. The backlighting apparatus of claim 7, wherein the etchings include at least one of: a material that coats the first side, material removal in the first side, or molds of the first side.

9. The backlighting apparatus of claim 8, wherein the etchings include the material that coats the first side, the material including phosphor.

10. The backlighting apparatus of claim 8, wherein the etchings include the material removal in the first side, the material being removed via one or more of: ablation, excision, abscission, cutting, engraving, imprint, incision, corrosion, abrasion, dissolution, erosion, or oxidation.

11. The backlighting apparatus of claim 8, wherein the etchings include the molds of the first side, the molds including one or more of: protrusions, nodules, bumps, convexities, ridges, or bulges.

12. A backlighting apparatus comprising:
a translucent planar lightguide including a first side and a second side opposite the first side; and a substrate including a plurality of micro-LEDs distributed across a width of the substrate, the substrate wrapped around an edge of the lightguide so as to cover the edge, a portion of the first side, and a portion of the second side, wherein each of the portion of the first side, the portion of the second side, and the edge of the lightguide have at least one micro-LED of the plurality of micro-LEDs positioned on the substrate so as to emit light into the lightguide therethrough.

13. The backlighting apparatus of claim 12, further comprising a reflective coating disposed at the second side, the reflective coating configured to reflect the light emitted from the micro-LEDs back into the lightguide towards the first side.

14. The backlighting apparatus of claim 12, wherein at least one of the plurality of micro-LEDs has a cross-section with a maximum height between about 5 microns to about 20 microns and a diameter between about 10 microns to about 50 microns.

15. The backlighting apparatus of claim 12, wherein the substrate is flexible and has a thickness of about 70 microns to about 200 microns.

16. The backlighting apparatus of claim 12, wherein respective micro-LEDs of the plurality of micro-LEDs are oriented on the substrate to cast light in at least one direction of multiple directions including: perpendicular to the first side, perpendicular to the second side, or parallel to the first side and the second side.

17. A backlighting apparatus comprising:

a lightguide including a first side and a second side opposite the first side; and a substrate including a plurality of micro-LEDs distributed across a width of the substrate, the substrate wrapped around an edge of the lightguide so as to cover the edge, a portion of the first side of the lightguide, and a portion of the second side of the lightguide, wherein two of the edge of the lightguide, the portion of the first side of the lightguide, or the portion of the second side of the lightguide, have a micro-LED, respectively, of the plurality of micro-LEDs positioned on the substrate so as to emit light into the lightguide therethrough.

\* \* \* \* \*